Nov. 17, 1953     E. V. HAAKE     2,659,883
RADIO RANGE TRACKING SYSTEM
Filed March 29, 1946
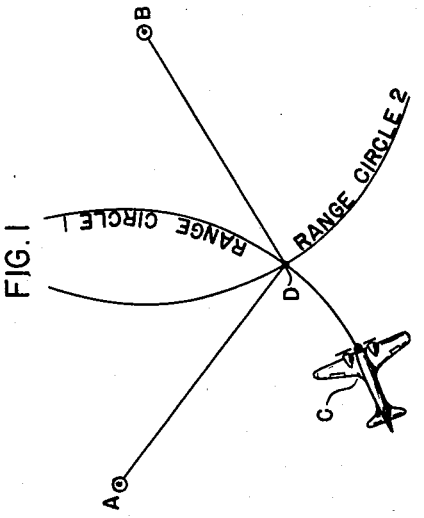
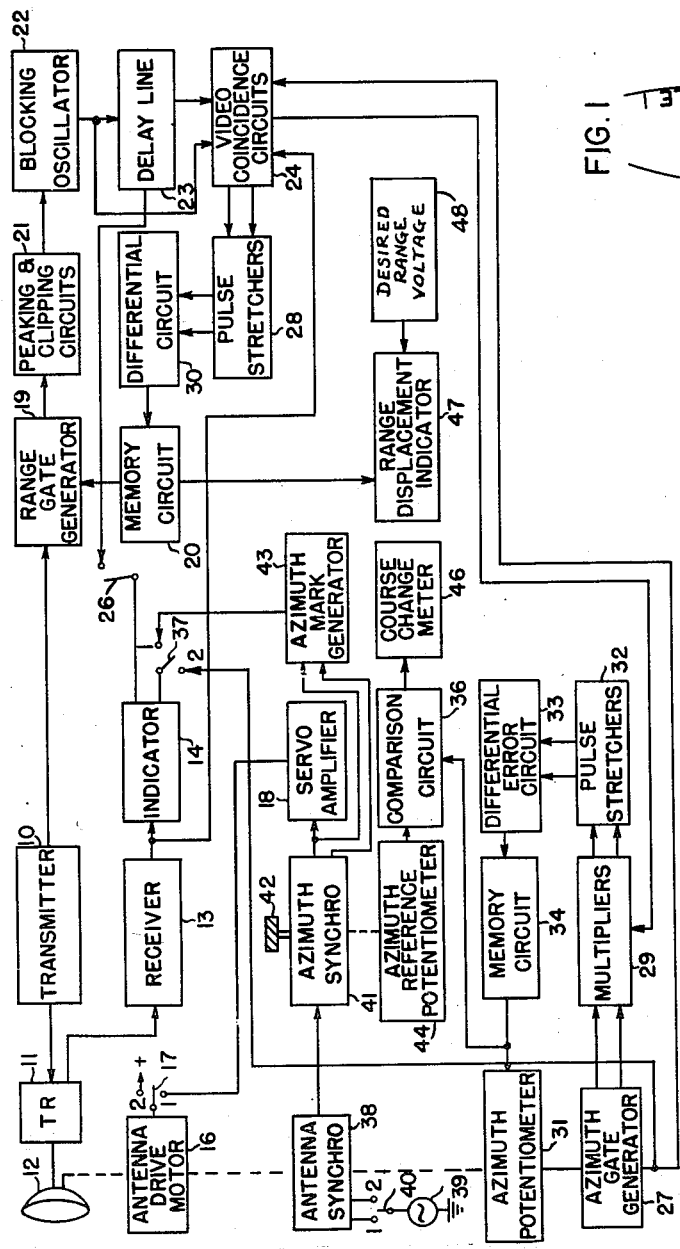
INVENTOR.
EUGENE V. HAAKE
BY William D. Hall
ATTORNEY Patented Nov. 17, 1953

2,659,883

UNITED STATES PATENT OFFICE 2,659,883

RADIO RANGE TRACKING SYSTEM

Eugene V. Haake, Cleveland, Ohio

Application March 29, 1946, Serial No. 658,189

4 Claims. (Cl. 343—15)

(Granted under Title 35, U. S. Code (1952), sec. 266)

The invention described herein may be manufactured and used by or for the Government for governmental purposes, without the payment to me of any royalty thereon.

This invention relates generally to electrical apparatus, and, more particularly, to an apparatus for providing the pilot of an aircraft with information enabling him to fly a specified course to a predetermined destination.

It is frequently desirable to determine the position of a moving aircraft with respect to a chosen ground target for the purpose of dropping bombs or other missiles thereon. One system devised for this purpose utilizes radio pulses from two beacon transmitters of known locations to determine the position of the aircraft and the time at which the aircraft has reached a previously chosen bomb-release point. More specifically, a directive beam of radio pulses is transmitted from the aircraft, and this beam is rotated in azimuth in such a manner that it periodically searches the ground area in the vicinity of the aircraft. When one of these radio pulses encounters one of the beacons, this beacon transmits a reply pulse which is received by the system in the aircraft and utilized to produce on the screen of a cathode ray tube or similar device an indication of the azimuth and range of the beacon relative to the aircraft. The distance of the bomb-release point from each of the two beacons is determined beforehand, and by flying a circular course maintaining continuaully the determined distance from the first beacon, the aircraft will reach the release point when the determined distance from the second beacon has been attained.

One common type of indicator, is a plan position indicator (PPI), in which the electron beam of the cathode ray tube is swept radially from the center of the tube face to the periphery, and this sweep is rotated about the central point in synchronism with the rotation of the directive antenna of the system. Pulses returned from reflecting objects or from beacon transmitters cause momentary intensifications of the electron beam. Thus a plane representation of the ground area surrounding the aircraft is produced on the indicator screen, with the signals from beacons and reflecting objects in their approximate relative positions with respect to the aircraft, the position of which is represented by the center of the circular screen.

For the aircraft to follow a circular course about the first beacon, it is necessary to provide some means of comparing the actual position of this beacon as portrayed on the indicator screen with the desired position which the beacon would have relative to the aircraft if the latter were following the prescribed course. When the aircraft is on course, the ground track, or the direction of travel relative to the ground, will continually be perpendicular to the radius of its circular path, and its range from the first beacon will remain continually equal to the predetermined value. A line passing through the aircraft and perpendicular to its path should thus intersect the beacon located at the center of the circle.

Radio means have been devised for determining the direction of travel of an aircraft relative to the ground. This direction of travel is usually not the same as the heading of the aircraft due to the action of the wind in deflecting it from its path. The angle between the heading of the aircraft and its ground track is know as drift angle. If two ground points are chosen at different angular directions relative to the ground track of an aircraft, it can be shown geometrically that the aircraft approaches these points at different rates. Further, for a given position of the aircraft, if these points are separated by a predetermined difference in angular direction, the difference in the respective velocities of approach to these points varies directly as the mean angular displacement of these points from the direction of the ground track.

Due to the finite width of the directive beam of the antenna, an echo pulse received at a given instant may be a combination of a large number of echo signals from points at equal ranges but at slightly different azimuths. The phase of the radio-frequency oscillations making up each of these signals varies at a rate dependent upon the velocity of the aircraft relative to the point returning the echo. Since these velocities are not equal for various points, as stated above, the phase variation occurs at a different rate for each of these points, and hence a resulting amplitude modulation of the echo pulses is produced. The frequency of this modulation varies directly as the difference in respective velocities of approach, and, therefore, varies directly as the angular displacement of the direction of the antenna beam from the ground track of the aircraft. By an observation of this modulation frequency, which is low enough to be observed visually, the direction of the ground track of the aircraft may be determined, and the dirft angle may be measured. For a more detailed explanation of this method of determining drift angle and ground track, reference may be had to the copending application by Rubby Sherr, Serial No. 624,907, filed October 26, 1945.

Once the ground track of the aircraft has been determined, some means is necessary to indicate to the pilot the angular divergence of the direction of this ground track from the desired direction perpendicular to the radius of the circular course. This means may be called a pilot's direction indicator or PDI. It is also necessary to provide information as to the difference between the actual and the desired range of the first beacon from the aircraft. One system devised to accomplish these objects is that described in the copending application by Britton Chance, Serial No. 657,145, filed March 26, 1946, now U. S. Patent 2,624,877, granted January 6, 1953. The system of the present invention has been conceived as an improvement over the system disclosed in the Chance application in that the same ends are attained with the utilization of a smaller number of component circuits.

It is therefore an object of the present invention to provide a direction-indicating device which will enable a pilot to direct an aircraft upon a circular course of a predetermined radius around a fixed ground point which is a source of transmitted or reflected radio pulses. It is a more specific object to provide means for indicating to the pilot the angular divergence of the ground track of the aircraft from the desired position perpendicular to the radius of the circular course. It is a further object to provide means for indicating to the pilot the difference between the actual and desired range of the fixed ground point from the aircraft. It is still another object to render the operation of these indicating means automatic after certain initial data has been supplied to the indicating system. It is a further object of this invention to render the means for accomplishing the foregoing objects as simple and compact as possible.

Further objects, features and advantages of this invention will suggest themselves to those skilled in the art and will become apparent from the following description of the invention taken in connection with the accompanying drawings in which:

Fig. 1 is a diagram illustrating the method of navigation described above; and

Fig. 2 is a block diagram of an embodiment of the present invention.

Reference is made now more particularly to Fig. 1 for a description of the method of navigation for which this invention is intended to be used. A and B represent the radio responder beacons located on the ground and D represents the destination to be reached; e. g., a bomb release point. Range circle 1 represents the course followed by the aircraft C and is a circle having beacon A, hereinafter referred to as the target beacon or target, as a center and passing through destination D. Range circle 2 is a circle passing through destination D and having beacon B as a center.

Fig. 2 shows a system incorporating the principles of this invention. Transmitter 10 emits periodic pulses of radio frequency energy which are passed through transmit-receive (T-R) switch 11 to antenna 12, where said pulses are radiated into space in a directed beam. Reflected pulses from solid objects or transmitted pulses from beacons are returned to antenna 12 to be transmitted through T-R switch 11 to receiver 13. Receiver 13 amplifies and detects the received pulses and applies them to indicator 14, where they are made visible on a cathode ray tube screen. Indicator 14 may be of the PPI type described above, or of some similar convenient type. Antenna drive motor 16 causes azimuthal rotation of antenna 12, and may be connected by means of a single-pole, double-throw switch 17 either to a source of direct voltage of constant magnitude or to the direct current output of servo amplifier 18, which may vary both in polarity and in magnitude. Antenna drive motor 16 should be of a reversible type, so that the direction of rotation may be changed by changing the polarity of the voltage supplied to the motor through switch 17.

Transmitter 10 also produces voltage pulses synchronized with the transmitted pulses, and applies them as timing pulses to range gate generator 19. Range gate generator 19 may consist of any circuit capable of producing a periodic voltage pulse, the initial point of which coincides with a timing pulse from transmitter 10, and which has a duration proportional to the magnitude of a direct input voltage received from memory circuit 20. For example, a multivibrator might be employed in which the direct input voltage is applied as a bias to the grid of one of the vacuum tubes to control the output pulse duration. This periodic pulse or range gate of variable duration produced by range gate generator 19 is applied to peaking and clipping circuits 21. These latter circuits may consist of a resistance-capacitance peaker or differentiator circuit followed by a diode clipper, or any other circuits capable of producing a series of sharp pulses coinciding with the terminations of the pulses from generator 19. Each of the voltage pulses from peaking and clipping circuits 21 is applied to blocking oscillator 22, the constitution and operation of which are well known in the art, to initiate or trigger a cycle of operation thereof and to produce a coincident pulse having considerably more energy. Since the trigger pulses applied to blocking oscillator 22 should be of positive polarity, the pulses from range gate generator 19 should be of negative polarity, or, if this is not the case, a stage of amplification may be inserted to invert the pulses.

The output from blocking oscillator 22 is applied both to delay line 23 and to video coincidence circuits 24. Delay line 23 may consist of a network of capacitive and inductive elements forming an approximation to an electrical transmission line having lumped constants, an arrangement well known in the art. The line should be terminated in an impedance approximately equal to its characteristic impedance, so that the delayed pulses have substantially the same shape as the undelayed pulses. The signal applied to delay line 23 is delayed thereby in an amount approximately equal to the duration of one of the pulses comprising said signal. The delayed pulses are also applied to video coincidence circuit 24. These undelayed and delayed pulses will be hereinafter referred to as the first and second range reference gates respectively. A partially delayed pulse from the midpoint of the line is applied to indicator 14 through single-pole single-throw switch 26 to produce a target range circle on the indicator screen.

Video coincidence circuit 24 consist essentially of two channels to which the first and second range reference gates are respectively applied. Video signals from receiver 13 and a positive voltage pulse or azimuth gate from azimuth gate generator 27, which occurs when antenna 12 is aimed at the chosen target, are applied to both channels in parallel. Each of the channels of the video coincidence circuit has an output only when all three of its input pulses are simultaneously present, and the duration of this output varies directly as the coincidence of these voltages. It is thus seen that the magnitude of the pulse output from each of the channels is a measure of the amount of coincidence between the video pulse and the range reference gate applied to that channel. The pulse outputs of the two channels are applied to pulse stretchers 28. A second output, which is a combination of the signals from the two channels, is applied to multipliers 29. This output may be referred to as the gated video signal.

Pulse stretchers consist of R-C networks having time constants which are long relative to the duration of the pulses applied thereto. The outputs of pulse stretchers consist of pulses having a peak amplitude proportional to the energy content of the applied pulses and having substantially longer duration than the applied pulses. The outputs of pulse stretchers 28 are applied to differential error circuit 30. This latter circuit compares the amplitudes of the two pulses applied to it and transmits an output corresponding to the difference in amplitude to memory circuit 20.

A suitable differential error circuit is disclosed in the aforementioned copending application of Britton Chance, Serial No. 657,145. In brief, the differential error circuit in said copending application consists of two electron tubes, each of which has at least a cathode, a control electrode and an anode. The cathodes of both tubes are connected to the negative terminal of a power supply through a common resistance. The anode of one of the tubes is connected directly to the positive terminal of the power supply and the anode of the other tube is connected to the positive terminal through a load resistance. The two pulses to be compared are applied, respectively, to the inputs of the respective tubes, the output being taken across the load resistance.

Memory circuit 20 produces a varying direct voltage, the magnitude of which is proportional to target range, for application to range gate generator 19, as mentioned previously. The characteristics of memory circuit 20 are such that the variation of this target range voltage continues at a uniform rate during that portion of the antenna scan cycle when pulses are not received from the target beacon. The group of circuits which have just been described operate as a closed loop servo in such a manner as to cause continuous range tracking of the chosen target, even though antenna 12 may be in continuous rotation.

A suitable memory circuit is disclosed in the aforementioned copending application of Britton Chance. In brief, this memory circuit consists of a capacitor which is charged through a gas tube by the output of the differential error circuit. The voltage across the first capacitor is applied as an input to a first cathode follower. The output of the first cathode follower is applied to an input of an amplifier through a high resistance, and the output of the amplifier is applied as an input to a second cathode follower. A second capacitor is connected between the input of the amplifier and the output of the second cathode follower.

Antenna drive motor 16 also rotates azimuth potentiometer 31 synchronously with the rotation of antenna 12. Azimuth potentiometer 31 is supplied with a direct voltage and thus produces a sawtooth voltage, the frequency of which is equal to the antenna rotation frequency, and this latter voltage is applied to azimuth gate generator 27. The output of azimuth gate generator 27 comprises two opopsing sawtooth voltages, one of which is inverted with respect to the sawtooth voltage produced by azimuth potentiometer 31, and also a rectangular voltage pulse or azimuth gate which occurs each time antenna 12 is aimed at the chosen target. This azimuth gate pulse is applied to video coincidence circuits 24, as well as through a single-pole double-throw switch 37 to indicator 14 to produce a target azimuth marker. Multipliers 29 consist essentially of two amplifier channels to which the opposing sawtooth voltages from azimuth gate generator 27 are respectively applied. The gated video signal from video coincidence circiuts 24 is applied to both channels in parallel and the operation is such that an output is obtained from a channel only when both signals are applied simultaneously to this channel. The magnitude of each output is governed by the magnitudes of the respective input voltages, and these outputs are applied to pulse stretchers 32.

Pulse stretchers 32, differential error circuit 33 and memory circuit 34 operate in a manner similar to that outlined above with reference to the corresponding circuits used for range tracking to produce a varying direct voltage proportional in magnitude to the target azimuth for application to azimuth potentiometer 31. It will be noted that the group of circuits just described operate in a manner similar to that of the range tracking circuits to cause continuous azimuth tracking of the chosen target even though antenna 12 may be in continuous rotation.

Antenna drive motor 16 also produces rotation of antenna synchro 38 at a speed equal to the antenna rotational speed. Antenna synchro 38 may have two mutually perpendicular rotor coils which may be selectively excited by means of alternating current source 39 through single-pole double-throw switch 40, and the stator terminals are connected to the stator terminals of azimuth synchro 41. The rotor of azimuth synchro 41 is adapted to be rotated manually by means of a knob 42. A voltage from a rotor winding of azimuth synchro 41 is applied to servo amplifier 18, the latter producing a direct voltage for application to antenna drive motor 16 through switch 17. Servo amplifier 18 may be of the type well known in the art which produces a direct output voltage, the magnitude and polarity of which are respectively determined by the magnitude and phase of the alternating input voltage. A servo loop is thus formed comprising antenna drive motor 16, servo amplifier 18, azimuth synchro 41 and antenna synchro 38, which operate in such a manner as to drive antenna 12 so that it maintains a position corresponding to the manually adjustable position of the rotor of azimuth synchro 41.

All of the circuits thus far described are utilized in the same form in the system disclosed in the copending application by Britton Chance referred to above.

Azimuth mark generator 43 receives input voltages from azimuth synchro 41 and produces a voltage pulse when antenna 12 assumes an azimuth perpendicular to the aircraft ground track and in the direction of the target, said voltage pulse being applied when desired to indicator 14 through switch 37 to produce a perpendicular-to-ground-track marker on the indicator screen. Azimuth mark generator 43 may comprise a circuit such as that disclosed in the copending application by Amasa S. Bishop, Serial No. 598,157, filed June 7, 1945, now U. S. Patent 2,547,363, granted April 3, 1951. If desired, the synchro which supplies voltage to the input of the azimuth mark generator may have two mutually perpendicular electrically insulated rotor coils rather than the three interconnecting coils shown in the Bishop application, and the externally-added alternating voltage therein referred to may be applied in series with the voltage output from one of these two rotor coils. By this arrangement, the voltages from the two rotor coils of synchro 41 described above may be used as input voltages to azimuth mark generator 43 as shown in Fig. 2. It should be noted that the rotor coil in series with the output of which the external voltage is added should be the one which does not supply the input voltage to servo amplifier 18.

Azimuth reference potentiometer 44 is mechanically coupled to the rotor of azimuth synchro 41 and supplied with voltage from a direct current source, not shown. The orientation of the potentiometer slider is such that when knob 42 is in a position corresponding to the direction of the ground track, the magnitude of the output voltage of the potentiometer is proportional to the angle between the heading of the aircraft and the direction perpendicular to the ground track of the aircraft. This output voltage is applied to comparison circuit 36, where it is compared in magnitude with the direct target range voltage from memory circuit 34. Comparison circuit 36 may consist of two vacuum tubes connected as cathode followers, to the control grids of which the direct voltages to be compared are respectively applied. The potential difference between the cathodes of the two vacuum tubes then corresponds in magnitude and polarity to the difference in the magnitudes of the two input voltages. This difference may be measured by course change meter 46 which may consist of a zero-center voltmeter, capable of indicating voltage differences of either polarity, connected between the cathodes of the vacuum tubes of comparison circuit 36. Course change meter 46 may be calibrated to read the heading error directly in degrees.

Memory circuit 20 also applies a direct voltage proportional to target range to range displacement indicator 47. This latter circuit may be similar to comparison circuit 36 in that it may consist of two vacuum tubes connected as cathode followers to the control grid of one of which is applied the voltage from memory circuit 20. Desired range voltage circuit 48 includes a calibrated potentiometer from which a voltage proportional to the desired range to the target is obtained. The desired range voltage is applied to the control grid of the other vacuum tube. A voltmeter similar to meter 46 connected between the cathodes of the two vacuum tubes then may be calibrated to read range displacement directly in yards.

A typical operation of the system whose components and nature have just been described might be as follows:

Let it first be assumed that the aircraft is in flight and that the transmitter 10, receiver 13 and the indicator 14 are in operation. When the aircraft approaches sufficiently close to the target beacon, the beacon signal will appear on the screen of the indicator. The aircraft may then approach the target beacon until a distance is reached which is approximately equal to the radius of the desired circular course about the beacon. With switch 17 in the number 1 position, a determination of ground track and drift angle may now be made as previously described by rotating antenna 12 by means of its servo connection to knob 42. With knob 42 now remaining set in a position corresponding to the ground track, switch 17 may be thrown to position 2. Antenna 12 will now be rotated continuously, and a null will occur in the voltage applied from azimuth synchro 41 to servo amplifier 18 and azimuth mark generator 43 each time the antenna passes through a position corresponding to the direction of the ground track. If switch 40 is now thrown to position 2, the second rotor coil of antenna synchro 38 will be energized, and these nulls in voltage will occur when the antenna is in a position perpendicular to the previously determined ground track. If switch 37 is in the number 1 position, the voltage pulses generated by azimuth mark generator 43 from the previously mentioned voltage nulls will be applied to indicator 14 to produce a perpendicular-to-ground track marker on the screen. The heading of the aircraft may now be changed, if necessary, to cause the perpendicular-to-ground-track-marker to intersect the beacon indication on the screen of the indicator. If any considerable change was made in the heading of the aircraft, a new determination of ground track may be necessary, since the drift angle may have been appreciably altered, and any further heading corrections may then be made. The aircraft now is approximately on course, and switch 26 may be closed, while switch 37 is thrown to position 2, in order to adjust the system for automatic operation.

A range circle produced by the pulse from the midpoint of delay line 23 and an azimuth mark produced by the azimuth gate pulse from generator 27 now appear on the screen. The direct output voltages of memory circuits 20 and 34 may now be adjusted to initiate automatic range and azimuth tracking. These voltages may be varied by the means described in the copending application of Britton Chance, referred to above, until the range and azimuth marks coincide with the beacon indication on the screen. Range and azimuth tracking will now proceed as described in connection with the explanation of the various components of the system. The potentiometer of range displacement indicator 47 may now be adjusted according to the radius of the desired circular course, and indications of heading corrections and lateral displacement will be given continuously to the pilot by means of the indicators.

If the aircraft is to travel any considerable portion of the circular course before reaching the bomb release point, occasional redeterminations of drift angle should be made. During this time similar redeterminations may also be made to allow for possible changes in wind direction or velocity during the time the aircraft is traveling its prescribed course.

While there has been described what is at present considered to be the preferred embodiment of the invention, it will be obvious to those skilled in the art that various changes and modifications may be made therein without departing from the spirit and scope of the invention.

The invention claimed is:

1. A pilot's direction indicating system, including means for producing a first direct voltage the magnitude of which is continuously proportional to the range of a fixed point from a moving aircraft, means for producing a second direct voltage the magnitude of which is proportional to the desired range of said fixed point from said aircraft, a first comparison means for comparing the relative magnitudes of said first and second direct voltages, means for producing a third direct voltage the magnitude of which is continuously proportional to the angle between the heading of said aircraft and a line perpendicular to the ground track of said aircraft, means for producing a fourth direct voltage which is continuously proportional in magnitude to the azimuth angle of said fixed point relative to the heading of said aircraft, a second comparison means for continuously comparing the magnitudes of said third and fourth voltages, and means for providing indications of the information derived from said first and second comparison means.

2. A pilot's direction indicating system comprising: means for tracking the range and azimuth of a fixed point from a moving object, said range and azimuth tracking means including means for producing a first direct voltage the magnitude of which is continuously proportional to the range of said fixed point from said moving aircraft; means for producing a second direct voltage the magnitude of which is proportional to the desired range of said fixed point from said aircraft; a first comparison means for comparing the relative magnitudes of said first and second direct voltages; said range and azimuth tracking means further including means for producing a third direct voltage the magnitude of which is continuously proportional to the angle between the heading of said aircraft and a line perpendicular to the ground track of said aircraft; means for producing a fourth direct voltage which is continuously proportional in magnitude to the azimuth angle of said fixed point relative to the heading of said aircraft; and a second comparison means for continuously comparing the magnitudes of said third and fourth voltages.

3. A pilot's direction indicating system for use in an aircraft, said system including a rotating directive antenna, means for determining a first direction perpendicular to the ground track of said aircraft, means for producing a direct voltage the magnitude of which is continuously proportional to the angle between the heading of said aircraft and the direction perpendicular to the ground track thereof, means for determining the azimuth of a given fixed point with respect to the heading of said aircraft, means for producing a direct voltage the magnitude of which is continuously proportional to the magnitude of this azimuth angle, means for comparing the relative magnitudes of said first and second direct voltages, and means for producing a visible indication of the amount of difference between the magnitudes of said direct voltages.

4. A pilot's direction indicating system for use in an aircraft, said system including a rotating directive antenna, means for determining a first direction perpendicular to the ground track of said aircraft, means for producing a direct voltage the magnitude of which is continuously proportional to the angle between the heading of said aircraft and the direction perpendicular to the ground track thereof, means for determining the azimuth of a given fixed point with respect to the heading of said aircraft, means for producing a direct voltage the magnitude of which is continuously proportional to the magnitude of this azimuth angle, means for comparing the relative magnitudes of said first and second direct voltage, and means for producing an indication of the amount of difference between the magnitude of said direct voltages.

EUGENE V. HAAKE.

References Cited in the file of this patent

UNITED STATES PATENTS

| Number | Name | Date |
| --- | --- | --- |
| 2,403,562 | Smith | July 9, 1946 |
| 2,405,238 | Seeley | Aug. 6, 1946 |
| 2,408,048 | Deloraine | Sept. 24, 1946 |
| 2,408,742 | Eaton | Oct. 8, 1946 |
| 2,412,702 | Wolff | Dec. 17, 1946 |
| 2,419,239 | White | Apr. 22, 1947 |
| 2,427,219 | Luck | Sept. 9, 1947 |
| 2,480,208 | Alvarez | Aug. 30, 1949 |
| 2,508,565 | Chance | May 23, 1950 |